No. 633,890. Patented Sept. 26, 1899.
H. J. NOYES.
DAMPER.
(Application filed Sept. 1, 1898.)

(No Model.)

Witnesses,
Lewis W. Ford
L. M. Southern

Inventor,
Horatio J. Noyes.
Geo. W. Tibbitts, Atty.

UNITED STATES PATENT OFFICE.

HORATIO J. NOYES, OF ASHTABULA, OHIO.

DAMPER.

SPECIFICATION forming part of Letters Patent No. 633,890, dated September 26, 1899.

Application filed September 1, 1898. Serial No. 690,057. (No model.)

*To all whom it may concern:*

Be it known that I, HORATIO J. NOYES, a citizen of the United States of America, and a resident of Ashtabula, in the county of Ashtabula and State of Ohio, have invented certain new and useful Improvements in Dampers, of which the following is a specification.

This invention relates to dampers for smoke-pipes, air-pipes, flues, &c., in which dampers are used for regulating drafts; and it consists in the new constructions of a friction bearing-handle, in combination with the damper-disk and its journals, arranged to operate substantially as hereinafter described, and pointed out in the claim.

The object of the invention is to provide a simple and easy means for adjusting and holding the damper in any and all desirable positions with certainty and despatch.

The invention is illustrated in the accompanying drawings, in which—

Figure 2:
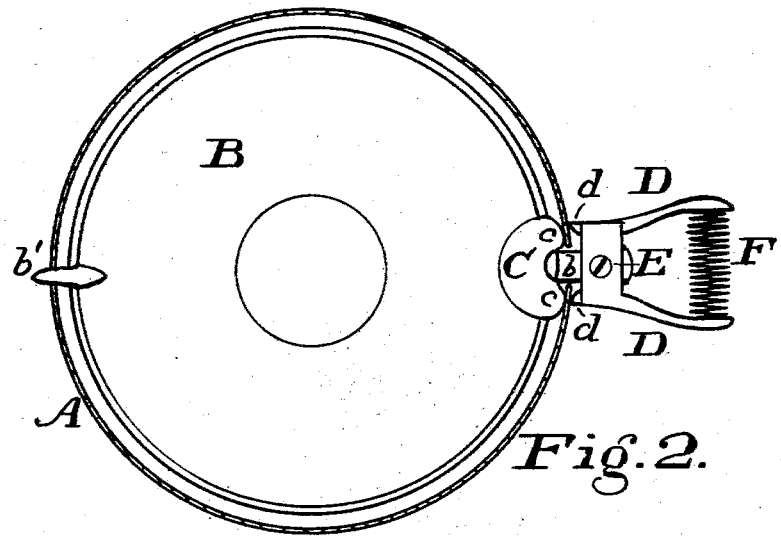
Figure 1:
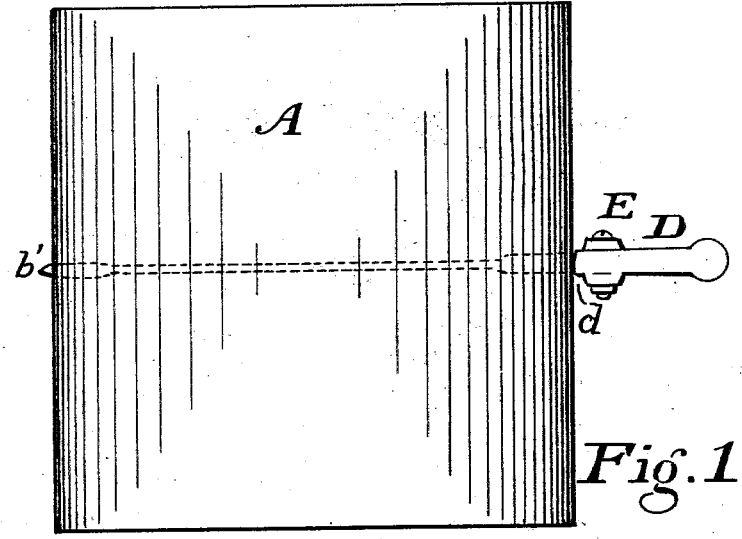
Figure 3:
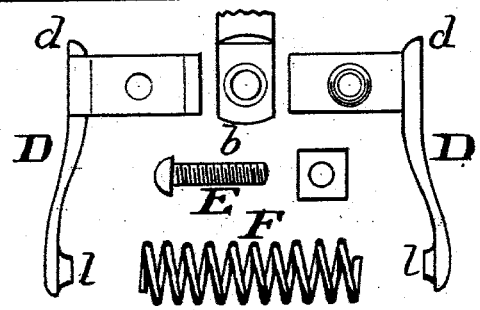

Figure 1 is a side elevation of a pipe having my improved damper attached. Fig. 2 is an end view of the same. Fig. 3 is a grouping of the several parts, respectively, of the new friction bearing-handle.

A represents a portion of pipe such as is used with stoves, hot-air furnaces, &c.

B is a plain metal disk damper provided with a flattened journal $b$ on one side and a pointed journal $b'$ on the opposite side.

C is a thickened portion on the damper adjoining the journal $b$, having two rounded projections $c\ c$, which bear against the inside surface of the pipe.

D D (seen separately in Fig. 3) are angle-levers, which are attached to the aforesaid journal $b$ by means of bolt E. At the angles of the said levers are provided projections $d\ d$, which bear against the outside of the pipe opposite to the aforesaid projections $c\ c$. The outer ends of the levers are curved outward and are held apart by means of a spring F, held in place by the studs $l\ l$.

From the foregoing the operations of this device are simple and as follows: The pressure of the spring causes a pressure of the projections $d\ d$ against the pipe and grip it between them and the inside projections $c\ c$ with sufficient force to hold the damper firmly in any position. By pressure applied by the operator on the outer ends of the levers the spring is compressed and the grip upon the pipe is released. Then the damper is easily turned, and by relinquishing said pressure on the levers the spring again causes them to renew their grip on the pipe or flue.

In the manufacture of this invention minor changes may be found desirable in the form and proportions of some of the parts. I would not therefore have it understood that I confine myself to the precise line of construction herein shown and described, but reserve to myself the right to make all such changes without departing from the nature of the invention.

Having described my invention, what I claim, and desire to secure by Letters Patent, is—

In pipe-dampers, the gripping-handle consisting of the angle-levers D D having the grip bearing projections $d\ d$, in combination with the damper B, said levers pivoted onto the journal $b$ of the damper, the pressure-spring F between the outer ends of the levers adapted to operate for gripping the damper to the pipe, substantially as described and for the purpose specified.

Signed by me at Ashtabula, Ohio, this 29th day of August, 1898.

HORATIO J. NOYES.

Witnesses:
JAMES RALSTON,
GEO. D. PARKER.